United States Patent
Dubrovsky

(10) Patent No.: US 6,645,438 B1
(45) Date of Patent: Nov. 11, 2003

(54) METHODS AND APPARATUS FOR PRODUCING FULLERENES IN LARGE QUANTITIES FROM LIQUID HYDROCARBONS

(75) Inventor: Roman Dubrovsky, Bronx, NY (US)

(73) Assignee: New Jersey Institute of Technology, Newark, NJ (US)

( * ) Notice: Subject to any disclaimer, the term of this patent is extended or adjusted under 35 U.S.C. 154(b) by 0 days.

(21) Appl. No.: 09/565,722

(22) Filed: May 5, 2000

(51) Int. Cl.⁷ .............................. B01J 19/08; B23K 9/00; B23K 26/00
(52) U.S. Cl. ..................... 422/151; 422/158; 422/186; 422/186.04; 422/186.21; 422/186.22; 422/186.25; 204/168; 204/173; 219/121.11; 219/121.36; 219/121.6
(58) Field of Search ...................... 423/445 B, 445 R, 423/447.1, 447.2, 450; 422/151, 186.11, 186.13, 186.14, 186.18, 186.21, 186.22, 150, 152, 156, 158, 186, 186.04, 186.19, 186.2, 186.25; 204/157.41, 157.47, 168, 173; 219/121.11, 121.27, 121.36, 121.6

(56) References Cited

U.S. PATENT DOCUMENTS

| | | | |
|---|---|---|---|
| 5,188,806 A | * 2/1993 | Kuehner et al. | 422/151 |
| 5,227,038 A | 7/1993 | Smalley et al. | 204/173 |
| 5,273,729 A | 12/1993 | Howard et al. | 423/445 |
| 5,300,203 A | 4/1994 | Smalley | 423/445 |
| 5,304,366 A | 4/1994 | Lorents et al. | 423/445 |
| 5,393,955 A | 2/1995 | Simmons | 204/157.47 |
| 5,493,094 A | 2/1996 | Simmons | 423/445 |
| 5,494,558 A | 2/1996 | Bunshah et al. | 204/192.15 |
| 5,876,684 A | * 3/1999 | Wither et al. | 423/445 B |

* cited by examiner

Primary Examiner—Glenn Caldarola
Assistant Examiner—Alexa A. Doroshenk
(74) Attorney, Agent, or Firm—Duane Morris LLP

(57) ABSTRACT

A method and apparatus for producing fullerenes, in large quantities at an economical cost, from liquid and gaseous hydrocarbons treated by a high energy source in a reactor devoid of oxygen are presented. The liquid hydrocarbons preferably selected from used hazardous materials such as used motor oils, oils, crude petroleum or petroleum cracking by-products, and the gaseous hydrocarbons such as methane and acetylene, are introduced into the oxygen deprived reactor and exposed to a high energy source which may be a plasma jet, a laser beam or a submerged electrical arc. Exposure to the high energy source causes the hydrocarbon atoms to disassociate, thereby converting the liquid and gaseous components into a vapor or cloud of mixed material. The vapor or cloud is then processed to enable the liberated carbon atoms to bind and recombine to form fullerenes. The cloud is then introduced into a condensation zone of said reactor to form a mixture of fullerenes, solid soot and residue gases. The fullerenes and solid soot are separated from said residue gases, then the fullerenes are separated from the solid soot. The end result of the technique is the extraction of a mixture of fullerenes $C_{60}$, $C_{70}$ and higher fullerenes.

7 Claims, 3 Drawing Sheets

METHODS AND APPARATUS FOR PRODUCING FULLERENES IN LARGE QUANTITIES FROM LIQUID HYDROCARBONS

FIELD OF THE INVENTION

The present invention relates to methods and apparatus for the synthesis, recovery, and separation of fullerenes. More particularly, this invention relates to a method for producing fullerenes in large quantities by thermo-cracking of liquid hydrocarbon contained waste products such as motor oil or other hydro-carbon liquids.

BRIEF DESCRIPTION OF THE PRIOR ART

Until recently, only two forms of carbon crystalline arrangements were known, namely graphite and diamond. In 1985 Robert F. Curl and Richard E. Smalley of Rice University in conjunction with Harold W. Kroto of University of Sussex reported that a new form of carbon can be made by laser irradiation of a graphite electrode to produce a soot in an evaporation chamber. [$C_{60}$ Buckminsterfullerene, Nature 318, 162–163, 1985]. Fullerenes are now successfully synthesized and identified by many researchers. Basically, $C_{60}$ fullerenes are hollow all-carbon cage molecules of 20 six-membered rings and 12 five-membered rings having the general shape of a soccer ball. Fullerenes have the general formula Cn, where "n" is an even integer from 60 to 960 (preferably from 60 to 90) atoms all having a shape indicative of a geodesic dome. This is why the name "fullerene" was chosen in honor of American architect R. Buckminster Fuller for his structure of the geodesic dome at the 1967 Montreal World Exhibition. The molecules also are called "buckminsterfullerenes" or "buckyballs". The molecules containing 60 or 70 carbon atoms ($C_{60}$, & $C_{70}$) are considered to be the most important due to their high stability and applicability, however higher fullerenes also have significant applications.

Buckyballs have captured the attention of many scientists in the World and have generated considerable coverage by the scientific and popular press. In 1990 at a conference in Germany W. Kratschmer and D. Huffinan announced that they found a simpler way to produce the mixture of $C_{60}$, & $C_{70}$ by striking an arc between two graphite electrodes and forming soot (particulate carbonaceous material rich fullerenes) from vaporized carbon. The method is reasonably simple but the production rate is low, obtaining only about 1 gram/hour.

Fullerenes as carbon-cage molecules can be doped with different elements and depending on the cage "tenant" find many potential applications in industry. These applications include: development of new solid and liquid lubricants, new coating procedures, water treatment activities, new optical devices, new superconductive materials, new cell batteries, new polymers, new photo-conductive materials, synthesis of drugs, and new materials for the semiconductor industry.

To date, fullerenes are synthesized using graphite electrodes subjected to electric arc discharge, plasma, or laser beam exposure: U.S. Pat. Nos. 5,300,203, 5,393,955, 5,304,366, 5,493,094, 5,227,038, where, according to the prior art, vaporized carbon was condensed and collected as a solid soot from which fullerenes were extracted by column chromatography. Later on, these processes were improved by introducing a sputtering method disclosed in U.S. Pat. No. 5,494,558, where fullerene-containing soot was prepared by bombardment of a carbon target with a sufficient amount of positive ions in the presence of an inert gas and a gas combustion method disclosed in U.S. Pat. No. 5,273,729, where fullerenes can be produced by burning carbon-contained compounds in a flame and collecting the condensibles. These two methods represent significant departures from graphite electrode methods but the production rate of all these methods is still extremely low.

The commercial use of fullerenes suffers from the inability of prior art methods to produce fullerenes in a large quantities and at economical prices.

The present invention provides a novel method for producing fullerenes in large quantities and at lower prices.

The present invention also provides a method which can be scaled to make commercial quantities of fullerenes.

Other disadvantages of the prior art also are overcome by the present invention which provides a method for fullerene production employing an electric arc, a plasma or a laser beam utilizing any carbon-contained waste liquid material such as waste motor oil, or other oils, crude petroleum, or hydrocarbon byproducts of petrochemical cracking.

SUMMARY OF THE INVENTION

The present invention employs a liquid phase of waste hydrocarbon hazardous materials as well as other hydrocarbon materials which materials are introduced into a plasma, a laser, or an electrical arc reactor source and which source is employed to strike the surface of the bulk liquid phase to thermo crack or dissociate the material. During thermo-cracking or dissociation of the liquid phase of the hydrocarbon material a mixture of burning gases and carbon vapor is formed. This mixture of gases appears as a cloud. In this cloud atoms of carbon establish bonds and recombine to form fullerenes. After quenching or condensation of the cloud a solid soot is formed in the reactor while a condensed burning gas is discharged from the reactor and is collected for further utilization.

One novel aspect of this invention is in the formation of large amount of fullerenes from liquid waste hydrocarbons and gas materials. The heating or high energy sources such as the plasma gun, the laser beam, or electric arc dissociate the hydrocarbons in the high temperature zone of the reactor in the absence of oxygen and produce carbon vapor and gas formed as a cloud where fullerenes are formed which then is quenched in a condensor zone of the reactor to form a mixture of solid soot, fullerenes and residue gases. By controlling the operational parameters (power, voltage and current) of the plasma jet, laser beam, or electric arc the process can enhance the efficiency of fullerene formation. The main advantages of this process are the significant rate (a few orders of magnitude higher) of fullerene formation at lower cost, and the ability to scale up production.

A better understanding of the invention will be obtained from the following detailed description and the accompanying drawings of illustrative application on the invention.

DETAILED DESCRIPTION OF THE INVENTION

Figure 1:
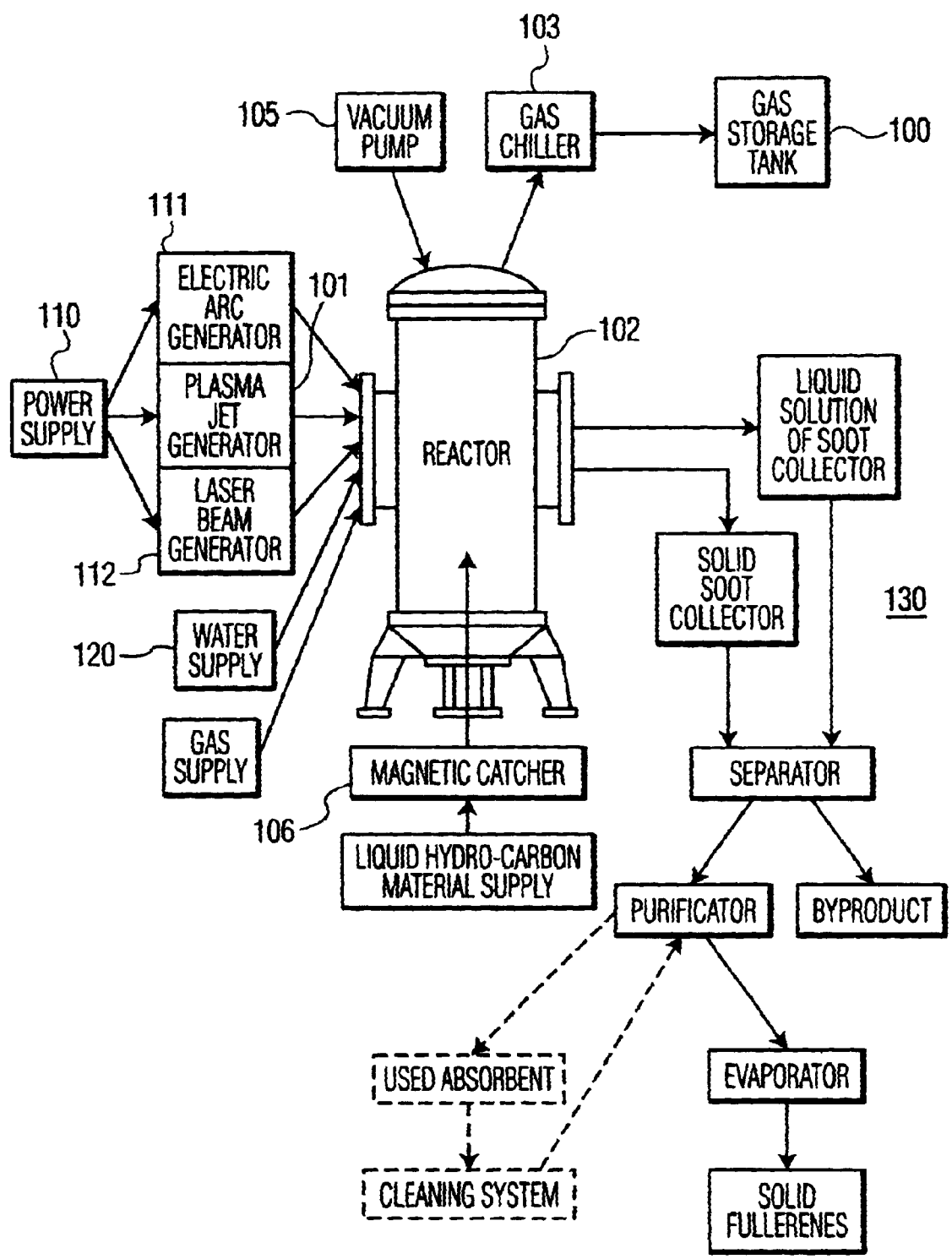
FIG. 1 is a block diagram depicting the structure of the present invention.
Figure 2:
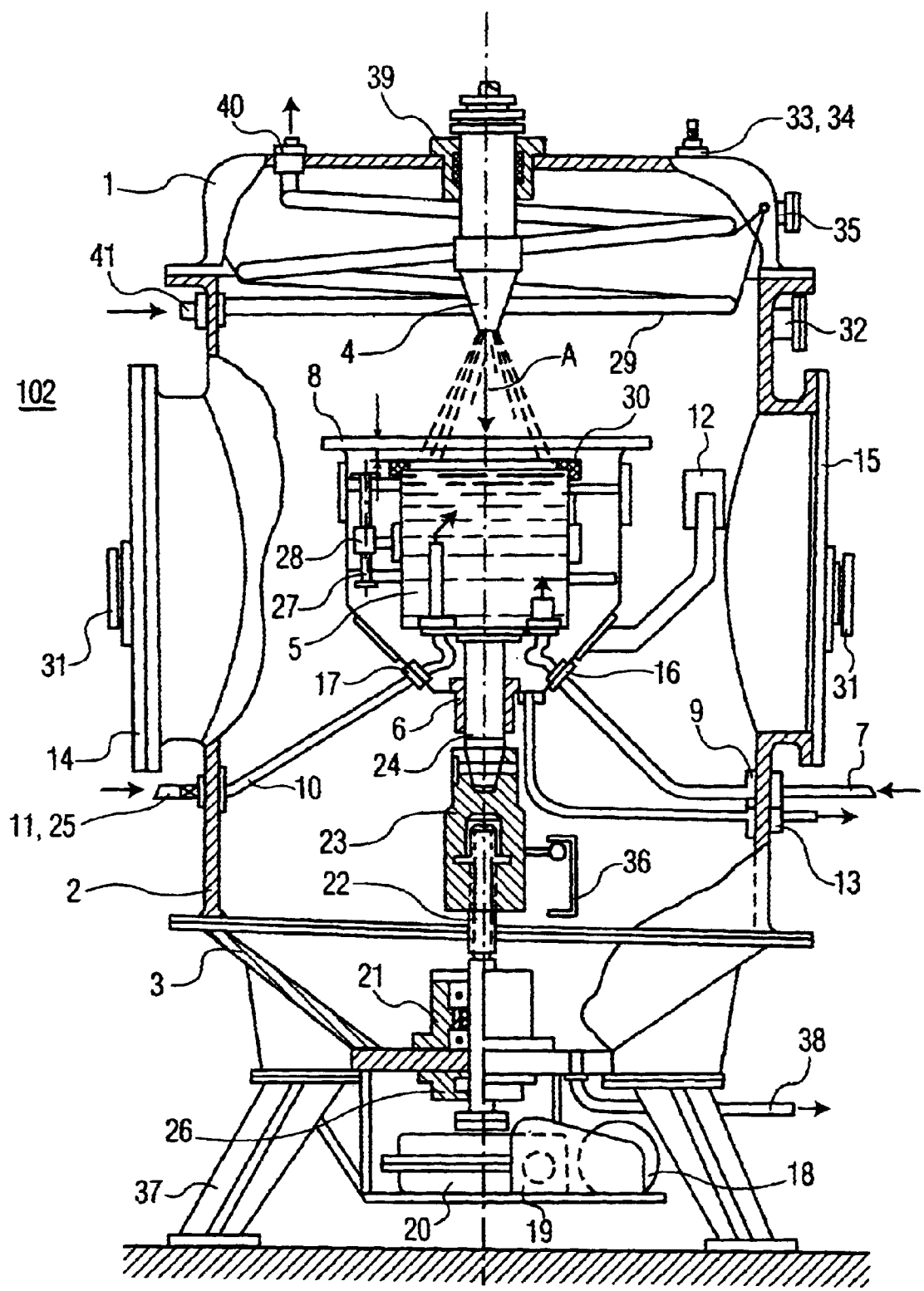
FIG. 2 is a schematic diagram depicting an embodiment of the present invention utilizing a plasma gun for operation.

Referring to FIGS. 1 & 2 one specific invention process and apparatus for practicing the process are illustrated. It should be understood that the specific process described is for illustrative purposes only and alternatives are envisioned. The invention will be described for the synthesis of a fullerene mixture and it is also applicable for obtaining different burning gases as a by-product.

In FIG. 2 the plasma gun 4 is one conventional type of non-transferable arc having a conventional thorium treated tungsten electrode as the cathode and anode. The electrode is connected to a power supply 110 so that a suitable potential across the anode is produced. The introduction of a stabilizer or inert gas into the anode produces a reactive plasma within the anode zone which extends axially downward in the direction of the arrow A as depicted in FIG. 2. This plasma gun 4 is of a conventional construction and known in the prior art. The plasma generator as shown in FIG. 1 as Plasma Jet generator 101. An electric arc, generator 111 and a laser beam generator 112 are shown as alternate sources and are connected to the power supply 110.

The plasma gun generator 4 (FIG. 2) is adjusted in order to have a plasma jet temperature sufficiently high to obtain the desired chemical reaction. As a rule, the reaction is carried out under atmospheric pressure or slightly above. Various gases can be used to produce and stabilize the plasma, such as an inert gas as helium, argon, or a reactive gas such as hydrogen or methane. The type of stabilizers used to generate the plasma and power input to the generator 101 will define the temperature of the plasma jet. The power input into the plasma generator 101 will determine, the intensity of the reaction generated by the plasma jet and may be varied accordingly.

In principle, the main area of the reaction or contact zone is defined by the high temperature zone of the plasma jet. This reaction zone produces the effluent cloud (gas-vapor) which flows as directed to the reactor collection means. The collection means is designed to accommodate the gas-vapor which escapes to the quench and distill area located above the feed tank assembly 8. The collector zone is the internal area located within the reactor 102 (FIG. 1) and has a water cooled double wall chamber or can employ any other cooling source. The plasma jet defines the boundaries of the treatment area of the liquid pool. The principle reaction of thermo-cracking or dissociation takes place within the plasma jet upstream toward the cooling area. The thermo-cracking process develops a cloud as a mixture of gases and carbon vapor. The cloud leaves the reaction zone and is directed to a collector where the vapor-gas phase is condensed to form a mixture of solid soot and residue gases. The separated gases leave the reactor chamber through the gas exhaust line 33 (FIG. 2) and soot is deposited on the internal surface of the water cooled zone of the reactor.

As soon as a mixture of gases and carbon vapor effluent enter the cooled chamber zone, they are condensed. The carbon vapor is converted to a solid soot. The condensed gases pass through a valve 34 of gas exhaust line 33 (see FIG. 2) to first stage of the chiller tank 103 and then to the gas storage tank 100 (see FIG. 1). The deposited buildup of the soot is periodically scraped off the interior surface of the reaction chamber or dissolved by a suitable solvent and are evacuated or removed through 38.

Extraction of the fullerenes from the carbon soot is accomplished by using any known non-polar solvent in which fullerenes are soluble. These solvents are: pentane, hexane, heptane, octane, benzene, toluene, xylene, carbon disulfide, carbon tetrachloride, pyridine, quinoline, and trichloroethane. Extraction of fullerenes from the solid soot is accomplished by exposing the soot to the selected solvent for a sufficient time necessary to separate all fullerenes from the soot. The conventional chromatography 130 is done outside the reactor vessel (FIG. 1). Extracted fullerenes can be left as a mixture or can be separated further into various fractions of individual fullerenes.

In order to remove all air from reactor chamber at the "start" of reactor stage the chamber is cleaned by providing a vacuum of $10^{-1}$–$10^{-3}$ torr using a conventional vacuum pump 105 (FIG. 1). Upon producing a vacuum in the reactor chamber 102, the service pressure controlled valve 25 (FIG. 2) is opened permitting the carbon contained gas to fill the vessel. As soon as the pressure inside the vessel becomes higher than atmospheric, the liquid feed material begins to pump through a valve 25 of the inlet nozzle 11 into the feed tank 5. The plasma gun 4 is then activated.

The mix of the feed materials can be enriched by the injection into the feed material liquid phase some hydrocarbon gases. In some instances, one of the reactant gases such as methane may be used to generate a plasma and is part of the feed liquid phase of the material. Introduced gas which under pressure flows into the feed material tank 5 via the inlet pipe for dispersal as bubbles into the feed material liquid phase. These bubbles pass upward through the liquid phase and are transported to the plasma jet zone thereby introducing an additional portion of carbon contained material. Considering the high yields obtained using the method of this invention it is also desirable to have a large amount of hydrocarbons present in the plasma jet zone. Preheating of the injected gas introduced into the liquid feed area is desirable. It was discovered during experimentation that this increases the efficiency of soot production. The purity of the soot and fullerenes produced by the process of this invention depends to a great extent on the purity of feed materials. The use of pure hydrocarbons as a feed material is preferred. The method employs used liquid feed materials which before arrival to the reactor 102 chamber pass through a magnetic catcher 106 to recover metallic debris of submicron and larger levels. The metallic debris is highly alloyed metallic powders which are of intrustic value and having properties which can be used in any powder metallurgy or for other metallurgy purposes.

The feed liquid material, comprising a hazardous waste liquid motor oil or other used liquid hydrocarbon materials such as any other oils, after passing through the magnetic catcher 106 (FIG. 1) is fed via inlet 7 (FIG. 2) by an oil pump into feed tank 5 of the reactor so that the feed liquid material is introduced upstream to impinge against the area of the plasma jet indicated by Arrow A.

Materials commonly used for high temperature application and which are substantially chemically inert and resistant to the reactants within the process conditions and with the particular feed material being used are desirable. For instance, the top part of the feed material tank which is exposed to the high temperature plasma jet should be annularly surrounded by a ceramic edging 30. This approach is well known in the metallurgy art and need not be further described.

When necessary, one can install a gas injector for the purpose of intensification of the carbon vapor condensation. The gas developed in the reactor chamber is cooled, then double cooled in the chiller 103 (see FIG. 1) and then returned back to the reactor 102. Cooling can be accomplished by a shaped coiled pipe 29 located inside the reactor chamber and having a number of concentric, equally spaced, exit nozzles. The nozzles are oriented downwardly to accommodate effluent carbon vapor flow. Other cooling systems may be used and various cooling temperatures may be maintained depending on the vapor mass produced in order to obtain different carbon soot composition.

For the practice of this invention, fullerene formation is implemented by a plasma jet, a laser beam or an electric arc as the heating sources. The thermo-cracking reaction described by equations [1 & 2] is achieved when the reactor contains a plasma gas or laser as a heating source. An embodiment used to practice this invention with a submerged electric arc as the heating source for the cracking reaction is slightly different and is based on equation [3] below. In this case, the apparatus shown in FIG. 3 permits one to obtain only the liquid solution of soot and different gases as a final product.

Referring again to FIG. 2 a specific apparatus and method of carrying out one embodiment of the invention will be described in greater detail. A reactor 102 of the conventional type having the usual water-cooled reactor head, main water cooled central part 2 is positioned on the bottom of the water cooled base 3. All connections between 1, 2 & 3 must be sealed.

These three pieces are members of the reactor assembly: reactor head 1, central part 2, or the main part of the reactor body, and bottom part, base 3 are provided with conventional instrumentation such as pressure gauges, temperature controls, vacuum meter, exhaust valves and overflow meters. These devices and gauges are necessary to provide discharge, inlet and safety operation. Central part 2 of the reactor chamber has two windows with cooled doors 14 & 15 clamped thereto. The bottom part of the chamber 3 has a stand end 37 with a level adjuster (not shown) to keep the reactor in a vertical position. All three members of the reactor have water inlet and water outlet ports. Both doors of the reactor have a view ports 31. The chamber has additional ports 32 & 35 and view ports (not shown), to provide access and allow observation of the interior of the quench central section of the reactor.

Plasma gun 4 is installed in an airtight bushing 39 on the top of reactor head 1. The anode of the plasma gun is water cooled and is positioned in axial alignment with the liquid feed tank 5. Feed tank 5 is capable of moving up and down along the vertical axis. Feed materials are introduced into feed tank-5 by single feed lines 7 & 11 and through the feed collar which is welded to the bottom of the feed tank. Fittings are connected to the feed sleeve inlet 9 & 10 so that the fluid and gas feed materials can be delivered in a controlled mode to the material feed tank.

The central section of the chamber 2 contains the feed tank assembly 8 with the feed tank 5.

The feed tank assembly 8 is secured inside the central part of the reactor by three equally spaced load carrying arms 12. The feed tank assembly 8 is connected by a single line 13 to a sleeve, which carries and accommodates all overflows and process residues. The feed tank 5 is placed inside the tank assembly 8 and has feeding pipes: which are the gas feed pipe 17, and the liquid material feed pipe 16 both directed through the feed tank assembly 8 and connected to the feed material and gas inlet sleeves 7 & 11. Mobile feeding pipes are connected outside the reactor chamber with the oil pump.(not shown on the drawings).

The feed tank assembly 8 is moveable. The linear motion for the feed tank assembly 8 is provided by a pole driver mechanism, which is secured from the outside and inside to the bottom part of the reactor chamber 3 and which is driven by the electric drive motor 18 on the end through a friction clutch, spur gear reducer 19, special worm reducer 20 which are connected through a coupler to a power screw as a lifting pole 22. Lifting pole 22 is directed into the reactor through the bottom part 3 of the chamber and is positioned on the duplex angular—contact bearings provided in a pressure sealed housing 21. The lifting pole 22 is assembled with a nut extension 23 having a conical female end on the top to provide easy assembly with the male end 24. The male end 24 is assembled with a bushing 6 and bolted to the feed collar of the feed tank. Pressure sealed bushing 26 is designed to prevent the introduction of oxygen from the atmosphere. In order to secure both conical ends 23 & 24 each has a close tolerated bored hole which accommodates an end threaded pin.

The feed tank 5 is movable inside the feed tank assembly 8 vertically by the lifting pole and slide guiding device 27. These are installed between the feed tank and feed tank assembly 8 to keep them in axial alignment with the plasma gun 4. This slide guiding device 27 has three equally spaced pin-partial bearing couples 28. The pin guide is clamped on the internal surface of the feed tank assembly 8 and provides the partial bushings with sufficient sliding freedom along the vertical axis in order to adjust gap "X"—which is the distance between the liquid surface of the treated feed material and feed tank assembly. In practice of this method the gap "X" operates to direct overflows of the feed materials from the feed material tank 5 to outlet line 13 and provides the necessary adjustment of the plasma gun 4 in order to control the plasma jet length. The partial bushings of the slide guiding device are secured to the outer surface of the feed tank 5 and fabricated from gray cast iron in order to provide the required wear resistance. The limit of feed tank adjustment along vertical axis as provided by the lifting pole is controlled by the installed stopper 36. In order to provide continuous full collection, exhaust flow of overflows and process residues, the bottom part of the tank assembly 3 is sloped.

The feed tank 5 and feed tank assembly 8 on the bottom surface also have pipe fittings to provide proper connections with the feed and exhaust lines of the inflow and the outflow system.

For cooling intensification purposes along and across the walls of member 1 there is a plain tube coil 29. The coil 29 carries cold water which is supplied from outside the chamber by independent inlet and outlet fittings 40 & 41. The water supply 110 is shown in FIG. 1.

In a case of malfunction the designed system uses solenoid valves to directly shut off the plasma generator, and the liquid material feed and gas pumps.

A brief general description of the invention and apparatus for producing fullerenes from liquid hydrocarbon materials by the use of a submersed electric arc will be beneficial in understanding the scope of this invention.

Figure 3:
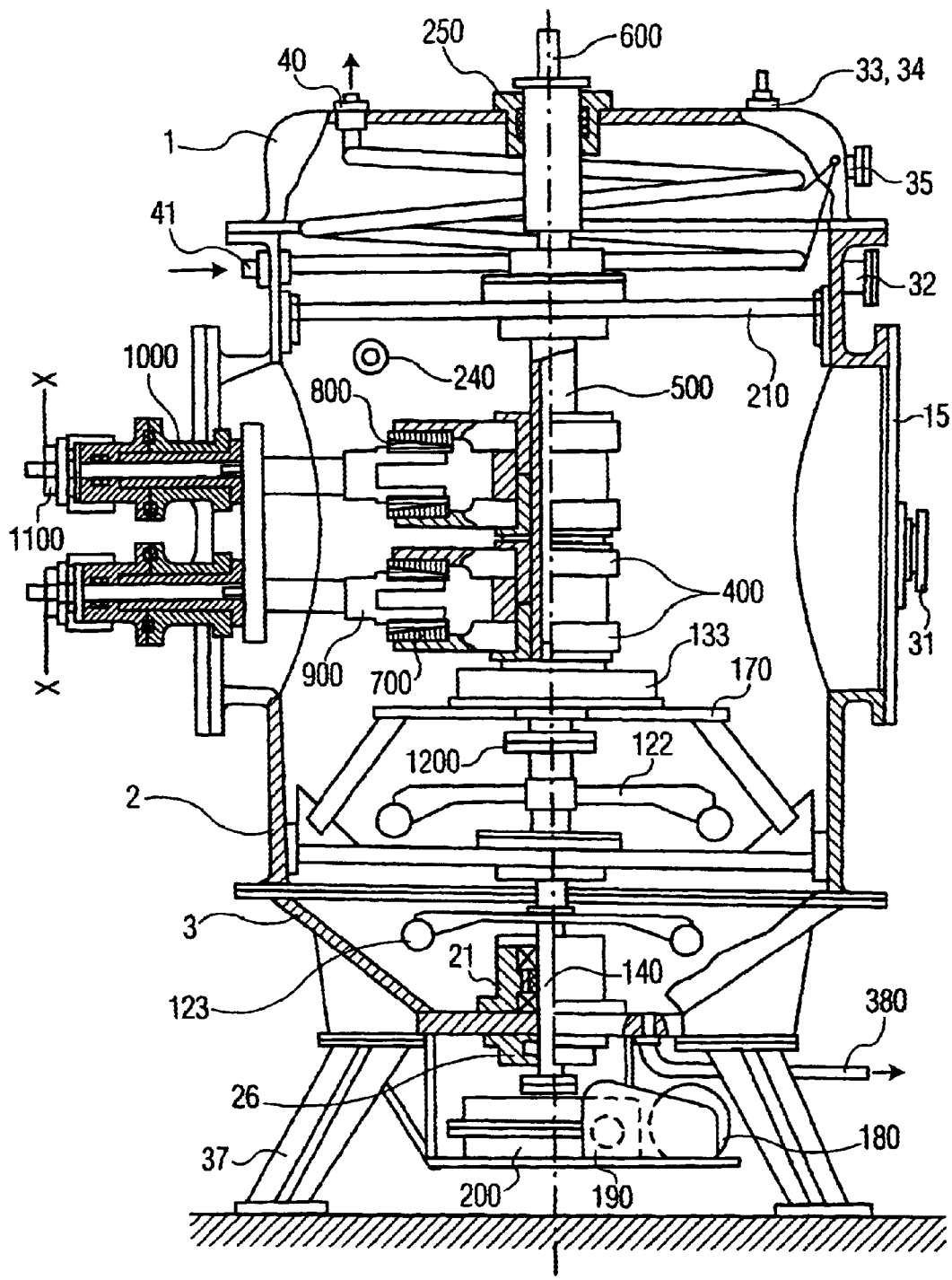
FIG. 3 is a schematic diagram of an embodiment of the invention utilizing a submerged electric arc device.

Referring to FIG. 3 a similar type of apparatus as that depicted in FIG. 2 is schematically illustrated, the apparatus is different in the respect that the apparatus described in FIG. 2 mainly permits vaporization of the liquid hydrocarbons. The apparatus depicted in FIG. 3 permits one to provide a liquid solution of soot which is rich with fullerenes and which can be recovered on a continuous basis or further used in the liquid solution.

The apparatus depicted in FIG. 3 employs a chamber vessel which is essentially of the same design as the apparatus shown in FIG. 2 with certain exceptions. The plasma generator head associated with the internal chamber devices such as the feed tank assembly, the slide guiding mechanism and the lifting pole have been omitted. The material feeding, water cooling and outflow lines remain the same. The electric arc power supply is coupled to the chamber which provides about 500 volts and a current intensity of 1000 amps. In accordance with this previous embodiment the electrode device is submerged in the hydrocarbon liquid and generates an intermittent arc which produces a liquid solution of soot rich with fullerenes. The electric arc is generated between two graphite electrodes installed in submerged device connected to the power supply 110. This set up is distinguished by the electrodes mounted in a way that one electrode is stationary and other one can produce rotation and develop a physical contact and breaking release with the stationary electrode. The arc is produced automatically by electrode separation when the apparatus experiences a voltage drop to zero value. The submerged electrodes are in contact with each other in the horizontal plane. The diameter or the circumference over which the electrodes are distributed is defined by design and available internal chamber configuration. Electrodes are properly insulated from the chamber body.

The device employs direct current (DC) but can be designed for alternating current (AC). If the reactor vessel is designed to use a multiple phase current, then provision can be made for two or three stationary electrodes associated with corresponding movable electrodes by simply redesigning the electrode carrying rotor or lever.

In the assembly the movable electrodes are arranged at a right angle to the axis of rotation and insure constancy of the path over which the arc traverses. This design is conventional. It can be achieved by implementing proper contact between the electrodes. In this case the contact takes place between the flat surface of the stationary electrode and movable electrode. According to embodiment of the present invention the rotary, movable electrodes are supported by a radial lever 400 with a hub keyed to the driven shaft 500. This lever has an inserted copper conductor connecting the source cable 600 with electrode tips 700 & 800 which tips have graphite inserts.

Two stationary electrodes 900 are positioned in the vessel by leak-tight bushings 1000 fitted into the chamber through one of the chamber windows. These electrodes are connected to a power supply by special set up installed outside the chamber. When the chamber is filled with liquid material, and the power is on, the clutch 1200 activates the driven shaft 500 bringing in contact the two electrode tips 700 & 800. For better sparking intensity contact at the electrodes is made between the two flat sloped surfaces of the graphite inserts. The inserts have high extremities on the contact surfaces of both electrodes. Contact between the two sloped surfaces as excessive wear can be adjusted in the horizontal plane by moving the stationary electrode using the screw-nut mechanism 1100. This is done when necessary and according to wear.

The rotation of the driving shaft 140 is provided by electric motor 180 and reducers 190 & 200. The driven shaft 500 is mounted in the chamber by mounting means 170 & 210, that serve by the dual role of supporting the shaft to carry the electrode radial lever 400, planetary gear reducer 133 and clutch 1200 and by establishing electric connections between the first conductor means 600 and the movable electrode. The driving shaft 140 supports mixers 122 & 123 operative to blend the liquid solution of hydrocarbons as well as to transfer the torque from the motor to the driven shaft 500. Liquid hydrocarbon materials are fed to the chamber through inlet pipe 240 and the produced liquid solution of the soot is accommodated by the outlet pipe line 380. The first conductor or source cable 600 is introduced into the reactor through the air-tight bushing 250.

The spark produced by the submerged electrodes immediately vaporizes a small volume of the liquid material which is positioned in the gap between the two electrodes. The developed vapor surrounded by the liquid material and charged by the spark will ignite a plasma. While the electrodes remain separated by the developed gap a continuing supply of power to this gap filled with vapor will maintain the plasma between electrodes and allow an electric arc to bridge the arc gap. During this time a substantial portion of electric current is flowing across the arc gap, maintaining the electric conductive plasma in place. The amount of voltage required to produce an arc depends on the size and composition of the electrodes, the length of the gap between the two electrodes, the nature of liquids in the gap and vapor. Commercially available arc welding equipment is one of the acceptable solutions. If direct current is used the power can be computer controlled and supplied in pulses. Electrical conductors can be cooled by liquid and can be provided with an additional cooling system. Because of electrode tip erosion (wear) the adjusting nut-screw mechanism for the stationary electrodes is employed. The maximum gap between electrodes is about 10 mm and it should be maximized by starting the plasma at a smaller gap. Increasing of gap distance during plasma operation will increase the productivity of soot formation. This submerged plasma developed by the spark in the gap between the two electrodes is a new tool necessary to convert the liquid hydrocarbon material exposed to the plasma into a vapor cloud. The developed vapor inside the liquid volume provides a short, instant time for carbon atoms to establish atomic bonds and recombination before vapor is starts the effluent drive to a surface of the feed material in the chamber and condensation to form a solid soot and different gases.

The formed soot dissolved in the hydro-carbon liquid materials contained in the vessel will be designated carboslarry. Formed gasses during thermo-cracking are collected at the top portion of chamber, additionally cooled and then directed to gas tank storage. The carboslarry left in the tank may be subjected to another vaporization and condensation depending on operator decision. Each additional vaporization treatment increases the density of fullerenes in the carboslarry. When the thermo-cracking process creates the carboslarry, it is evacuated outside the chamber through the line 380. All positions on FIG. 3 not referred to in the text remain the same as in FIG. 2 and the same names and functions are employed.

Extraction of fullerenes from the carboslarry is accomplished by the sequence of steps described in FIG. 1 as follows: separation, purification, evaporation and collection of solid fullerenes. The separation stage comprises the two following steps' conventional chromatography and centrifugal treatment.

Conventional chromatography is done outside the reactor vessel (FIG. 1) in order to separate the carboslarry from contaminants. The chromatography column is filled with an absorbent having a mesh mixture size of 20–40 or approximately 840–420 microns.

Centrifugal processing of the chromatographically-treated carboslarry is done in a centrifuge operating at 8000–1000 rpm. This step allows one to separate from the carboslarry the heavy solid soot particles suspended in it. The collected solid soot deposits on the walls of the centrifuge container is a very useful byproduct and has a solid grease-like consistency that can be used as a solid lubricant or can be used as an addition to liquid lubricants. Recovered from the centrifuge fluid are all types of fullerenes.

Purification is the next stage of fullerene recovery and comprises: conventional chromatography, coagulation and centrifugal treatment. Conventional chromatography is done with an absorbent as a silica gel mixture of mesh size 50–60 or approximately of 300–250 microns. After chromatography the recovered fluid is delivered for coagulation heat treatment of the obtained liquid solution. This is done at temperature 150–1800° C. in glassware on a steering heating platform for a few hours. Coagulation of fullerenes during heat treatment will increase the fullerene particles size and provide for better conditions for centrifugation. Centrifugal treatment of coagulated liquids is done in order to separate the type of fullerenes from the liquids. Ultracentrifuges with a continuous flow rotor or others operating at 80000 rpm are preferred.

The sedimentation time is computed as depending on the type of centrifuge used and is usually provided by manufacturer. All build ups of fullerenes as a deposit on the interior surface of the centrifuge container should be scrapped off. The leftovers of fullerenes in the centrifuge containers can be dissolved by toluene or another solvents and then treated in any available rotary evaporator. In order to separate fullerenes further into various fractions of individual fullerenes, one employs conventional chromatography.

For obvious reasons, according to FIG. 1 the used absorbent in the purification process 130 should be recovered, cleaned and reused. The absorbent cleaning solution will contain fullerenes which can be recovered from the solution.

Using the plasma gun and electric arc apparatuses as described above, a series of experimental runs were conducted wherein the feed material was used motor oil and a gas admixture depicted in the Table 1.

TABLE 1

| METHODS | PLASMA GUN | | SUBMERGED ELECTRIC ARC | |
|---|---|---|---|---|
| | SAMPLES | | | |
| FEED MATERIALS | SAMPLE 1 | SAMPLE 2 | SAMPLE 3 | SAMPLE 4 |
| USED MOTOR OIL | ▓ | | | |
| | | | ▓ | |
| USED MOTOR OIL + GAS ADMIXTURE | | ▓ | | |
| | | | | ▓ |

Analysis of various runs, operational conditions and the nature of the feedstock are illustrated in the list of examples shown below. All given examples represent prototypes for embodiments and are not intended to limit the scope of the present invention.

The unique properties of fullerenes were ascertainable by means of HPLC (high performance liquid chromatography) method clearly indicating the unique structural configuration of the fullerene mixtures obtained by this invention. Obtained chromatograms with built-in optical absorbance-time relationships reveal labeled picks of C60 and C70 fullerenes.

Identified samples in Table I were performed at following conditions:

SAMPLE 1

Feedstock introduced in the chamber was used motor oil scanned by the magnetic catcher.

Operation Conditions:
Motor oil equivalent flow rate: 3 kg/h
Current: 160–200 Amps
Power: 40–60 Kw
Estimated amount of produced soot: 90 g/h

SAMPLE 2

Feedstock introduced in the chamber was used motor oil scanned by the magnetic catcher and admixture of byproduct-produced mixture of gases: methane, acetylene & ethylene.

Operation Conditions:
Motor oil equivalent flow rate: 3 kg/h
Gas flow rate: 0.3 c.f/h
Gas pressure: 10 Barr
Current: 160–200 Amps
Power: 40–60 Kw
Estimated amount of produced soot: 100 g/h

SAMPLE 3

Feedstock introduced in the chamber was used motor oil scanned by magnetic catcher.

Operation Conditions:
Motor oil equivalent flow rate: 7.4 kg/h
Current: 160–200 Amps
Power: 40–60 Kw
Arc length: 8 mm
Estimated amount of produced soot: 90 g/h

SAMPLE 4

Feedstock introduced in the chamber was used motor oil scanned by the magnetic catcher and admixture of byproduct-produced mixture of gases: methane, acetylene & ethylene gas.

Operation Conditions:
Motor oil equivalent flow rate: 3 kg/h
Gas flow rate: 0.3 c.m/h
Gas pressure: 10 Barrs
Current: 160–200 Amps
Power: 40–60 Kw
Arc length: 8 mm
Estimated amount of produced soot: 90 g/h One can ascertain that there are many alternative embodiments as well as the use of different reactor vessels, hydrocarbons and solvents which can be substituted for the embodiments depicted, all of which are deemed to be encompassed within the spirit and scope of this invention.

The invention provides a method for producing fullerenes in commercially large quantities. Fullerenes are a new form of pure carbon in addition to the well known forms of graphite and diamond. Fullerenes are provided from a fullerene-contained solid soot produced by the condensation of vaporized carbon.

Any liquid hydrocarbon or petrochemical can be used as a carbon source. Liquid waste motor oil is an inexpensive material that can be used in the production of carbon vapor or to form a carbon cloud which maintained at certain conditions will promote fullerene formation during cloud condensation to form a solid soot containing fullerenes. Besides employing (waste) hydrocarbon sources, any petrochemical materials can be used in order to produce fullerenes.

The apparatus includes a reaction vessel filled with the used liquid hydrocarbons to be dehydrogenised and converted to a vapor of individual components. The method includes the steps of converting used liquid hydrocarbon materials by exposing them to a high temperature plasma jet, electric arc, or laser beam in the absence of oxygen. The converted gases and any other non-gaseous components are collected in a cold section devoid of oxygen of the reactor chamber. The collected gases are directed through a series of chillers for separation of the gases into individual components. The separated gases are collected in a storage vessel while none of the by-products of the process are released to the atmosphere.

The plasma arc generated by the plasma gun is a high temperature sustained plasma, where temperatures are in the range of 3500–10000° C. or higher. At such temperatures almost all organic or inorganic materials are split and vaporized due to the impact or the continuous strike of the plasma gun, laser or electric arc in the area defined as the contact zone of the reactor. The liquid and gas volumes of the individual components are vaporized in this contact zone.

While a plasma gun provides the required temperature for the cracking and converting of the selected liquid waste hydrocarbon material, such as waste motor oil, into a vapor phase, it is understood that sufficient temperatures can also be provided by use of an electric arc, or by the use of a laser beam.

The invention specifies the dehydrogenation of used liquid waste oils or other hydrocarbons in order to decompose the hydrocarbon liquid material and to convert the treated pool of these materials into a mixture of gases and carbon vapor as a cloud. A relatively high efficiency is obtained using the method and according to the method it is desirable to have excessive amounts of hydrocarbons present in the contact zone. One can add methane gas or another carbon containing gas to the liquid phase to increase production. In the simplest form, the dehydrogenation or cracking reaction of the invention uses a high power heating source such as a plasma jet, electric arc, or laser beam. Operation can be illustrated by the following relations:

(Liquid Phase)+Heating Source~Solid Soot+Gases [1]

(Liquid Phase+Gas Phase)+Heating Source~Solid Soot+Gases [2]

(Liquid Phase)+Heating Source~Liquid Solution of Solid Soot+Gases [3]

In order to obtain the final product or the fullerenes and in accordance with embodiments used in above equations [1,2 or 3], the sequence of stages should be: collection, separation, and purification or separation, collection and purification. Byproducts of the process such as burning gases are directed to a storage tank, and the solid soot is collected and used as a solid lubricant.

What is claimed is:

1. Apparatus for the synthesis of fullerenes, comprising:
a chambered reactor vessel having a top portion and a bottom portion and being devoid of oxygen, said reactor including a high energy source inside said reactor to provide a concentrated energy beam, a feed material tank assembly inside said reactor and operative to provide inflow of feed materials and outflows of residues, a condensing zone in said reactor and means operative to control process parameters;

means for feeding a mixture of a liquid hydro-carbon material into said feed material tank assembly, where said material is selected from the group consisting of used motor oils, crude petroleum, hydro-carbon byproducts of petro-chemical cracking, carbon contained gases and combinations of the above, in order to enable said energy beam to strike said material to form a vapor cloud;

said condensing zone included in said reactor is positioned for accepting said vapor cloud to produce a mixture of fullerenes and soot from said cloud; and means for processing said soot to produce fullerenes.

2. The apparatus according to claim 1 wherein said high energy source is selected from a plasma jet device, a laser beam device, or a submerged electric arc device or a combination of such devices.

3. The apparatus according to claim 1 wherein said high energy source is a plasma gun or a laser beam and wherein said feed tank assembly includes a positionally moveable feed tank for receiving said liquid hydrocarbon materials.

4. The apparatus according to claim 1 wherein said high energy source is a submerged electric arc and wherein said feed tank assembly includes a positionally stationary feed tank for receiving said hydrocarbon materials.

5. The apparatus according to claim 1 wherein said high energy source is a plasma gun or laser beam and wherein said condensing zone includes a coolant section.

6. The apparatus according to claim 1 wherein said high energy source is a submerged electric arc and wherein said condensing zone includes as a coolant zone a bulk of liquid hydrocarbons surrounding the vapor volume.

7. The apparatus according to claim 1 wherein said produced fullerenes are generally $C_N$ where N is a positive, even integer greater than thirty two.

* * * * *